United States Patent [19]

Namai et al.

[11] Patent Number: 4,560,266
[45] Date of Patent: Dec. 24, 1985

[54] CAMERA

[75] Inventors: Akihiro Namai; Ryoichi Suzuki, both of Kanagawa, Japan

[73] Assignee: Canon Kabushiki Kaisha, Tokyo, Japan

[21] Appl. No.: 626,735

[22] Filed: Jul. 2, 1984

[30] Foreign Application Priority Data

Jul. 8, 1983 [JP] Japan ................................ 58-125074

[51] Int. Cl.$^4$ .............................................. G03B 3/10
[52] U.S. Cl. .................................... 354/400; 354/402
[58] Field of Search ............. 354/400, 401, 402, 195.1

[56] References Cited

U.S. PATENT DOCUMENTS 4,274,720  6/1981  Tsujimoto ........................... 354/402
4,326,783  4/1982  Kawamura et al. ................. 354/402
4,396,267  8/1983  Hirohata et al. .................... 354/400
4,466,723  8/1984  Ikari et al. .......................... 354/400

Primary Examiner—Russell E. Adams
Attorney, Agent, or Firm—Toren, McGeady, Stanger, Goldberg & Kiel

[57] ABSTRACT

A camera having an electromagnetically operated autofocus mechanism wherein, during movement from a first to a second position, a photographic lens is set in an in-focus position. A returning drive power source for bringing the photographic lens back to the first position is charged during movement of the lens, and when it reaches the second position, the returning drive power source operates to reset the photographic lens to the first position.

8 Claims, 4 Drawing Figures

CAMERA

BACKGROUND OF THE INVENTION

1. Field of the Invention:

This invention relates to a camera having an electromagnetically driven rotor by which the movement of a photographic lens and the opening and closing operation of a shutter are controlled.

2. Description of the Prior Art:

It has already been known in the art to provide a camera having a rotor with a coil fixedly secured thereto and arranged in a magnetic field which upon energization is driven to move in different directions depending on the direction of current flow through the coil. As this rotor swings to a first direction, a photographic lens is moved to an adjusted position based on the output of an automatic focus detector. As it swings to the second direction, a shutter is opened and, after a time based on the output of an exposure control device, the shutter is closed. Such a camera is disclosed in U.S. Pat. No.4,396,267.In this camera, when the rotor once swings to the first direction, the photographic lens is made to advance by a prescribed distance. The swinging of the rotor to the first direction is recycled a number of times depending on the output of the automatic focus detector until the photographic lens reaches an in-focus position as is disclosed in Japanese Laid-Open Patent Application No. SHO 58-43434.

In cameras of the above type, it is necessary to return the photographic lens to the initial position after the termination of the exposure operation. According to the prior art, automatic charging of the photographic lens to the first position is carried out in connection with the motorized film winding operation. In the conventional cameras of the above type, therefore, the mechanism for controlling the movement of the photographic lens by the swinging of the roto must be associated with a driving torque transmission mechanism. This leads to drawbacks in that the camera is mechanically complicated, and that its size is increased.

SUMMARY OF THE INVENTION

A first object of the invention is to provide a camera having an electromagnetically operated focus adjusting device for a photographic lens with automatic means for charging a drive power source for the photographic lens to an initial position as it moves to the in-focus position, whereby a drive connection which would be otherwise necessary to transmit motion of an electric motor to the photographic lens when a film winding operation is later performed can be omitted with the advantage that, due to a reduced number of parts and a simplified structure of its mechanisms, a more compact camera is realized.

Other objects of the invention will become apparent from the following detailed description of embodiments thereof taken in connection with the accompanying drawings.

DETAILED DESCRIPTION OF THE PREFERRED EMBODIMENTS

Figure 1:
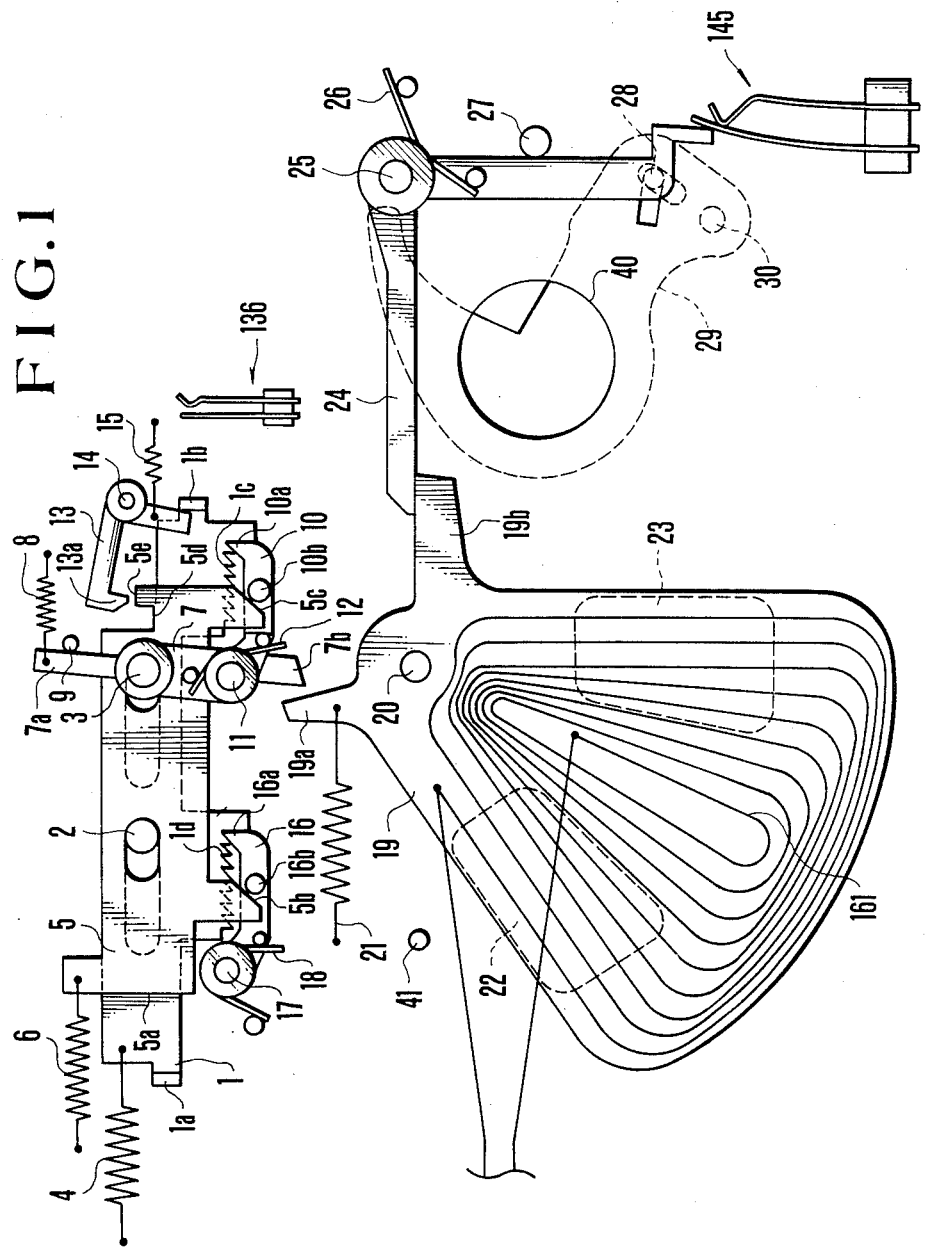
FIG. 1 is an elevational view of an embodiment of the camera according to the present invention.

In FIG. 1 there is shown one embodiment of the mechanisms of the camera according to the present invention, where a drive slide 1 is slidingly movably mounted on a base plate (not shown) with its longitudinally elongated slots on respective pins 2 and 3 and is urged by a spring 4 to move leftward as viewed in the drawing. Also at the left ano right hand ends of drive slide 1 there are provided bent portions 1a and 1b respectively, and at the lower edge there are provided ratchet toothed portions 1c and 1d. The drive slide 1 is operatively connected to a photographic lens holder (not shown) so that at the same time that the drive slide 1 moves, the photographic lens (not shown) also moves for focusing purposes. A release slide plate 5 has two slots movably fitted on the common pins 2 and 3 of the drive slide 1 and is urged by a spring 6 to move leftward. A reciprocating lever 7 is pivotally mounted on the pin 3 and is urged in a clockwise direction by a spring 8 connected to its armed portion 7a. Its clockwise movement is limited by a stopper 9. A ratchet 10 is pivotally mounted on a pin 11 provided on the lever 7, and is urged in a counterclockwise direction by a spring 12. The free end of ratchet 10 is formed to a pawl 10a engaging one of the teeth 1c of the drive slide 1. A latch lever 13 is pivotally mounted on a pin 14 provided on a base plate (not shown) and it is urged in a counterclockwise direction by a spring 15. Its counterclockwise movement is limited when its one arm abuts on the bent portion 1b of drive slide 1. A pawl lever 16 is pivotally mounted on a pin 17 provided on the base plate (not shown) and is urged in a counterclockwise direction by a spring 18. The free end of the lever 16 is formed to a pawl 16a engaging one of the teeth 1d of drive slide.

A rotor 19 is pivotally mounted on a pin 20 provided on the base plate, and it is urged in a counterclockwise direction by a spring 21. A coil 161, in printed-cireuit form on the rotor 19 is connected to a control circuit of FIG. 2. Magnet pieces 22 and 23 form magnetic circuits orthogonal to the direction of current flow in the printed coil 161. A shutter opening lever 24 is pivotally mounted on a pin 25 provided on the base plate, and is urged in a counterclockwise direction by a spring 26. Its counterclockwise movement is limited by a stopper pin 27. One arm of the opening lever 24 extends into the path of movement of an arm 19b of the rotor 19. Because the bias force of spring 21 is smaller than that of spring 26, the rotor 19 rests in abutting engagement against the lever arm 24 in the illustrated position. The opposite arm of opening lever 24 fixedly carries a drive connection pin 28 engaging in slots of two shutter blades 29, only one of which is illustrated for the purpose of clarity, so that as the opening lever 24 turns clockwise, the shutter blade 29 is turned about a pivot pin 30 in a counterclockwise direction to open an exposure aperture 40 formed in the base plate. 41 is a stopper pin for the rotor 19. 136 is an AF-END sensor switch; 145 is a count start switch. These switches constitute part of the control circuit of FIG. 2.

Figure 2:
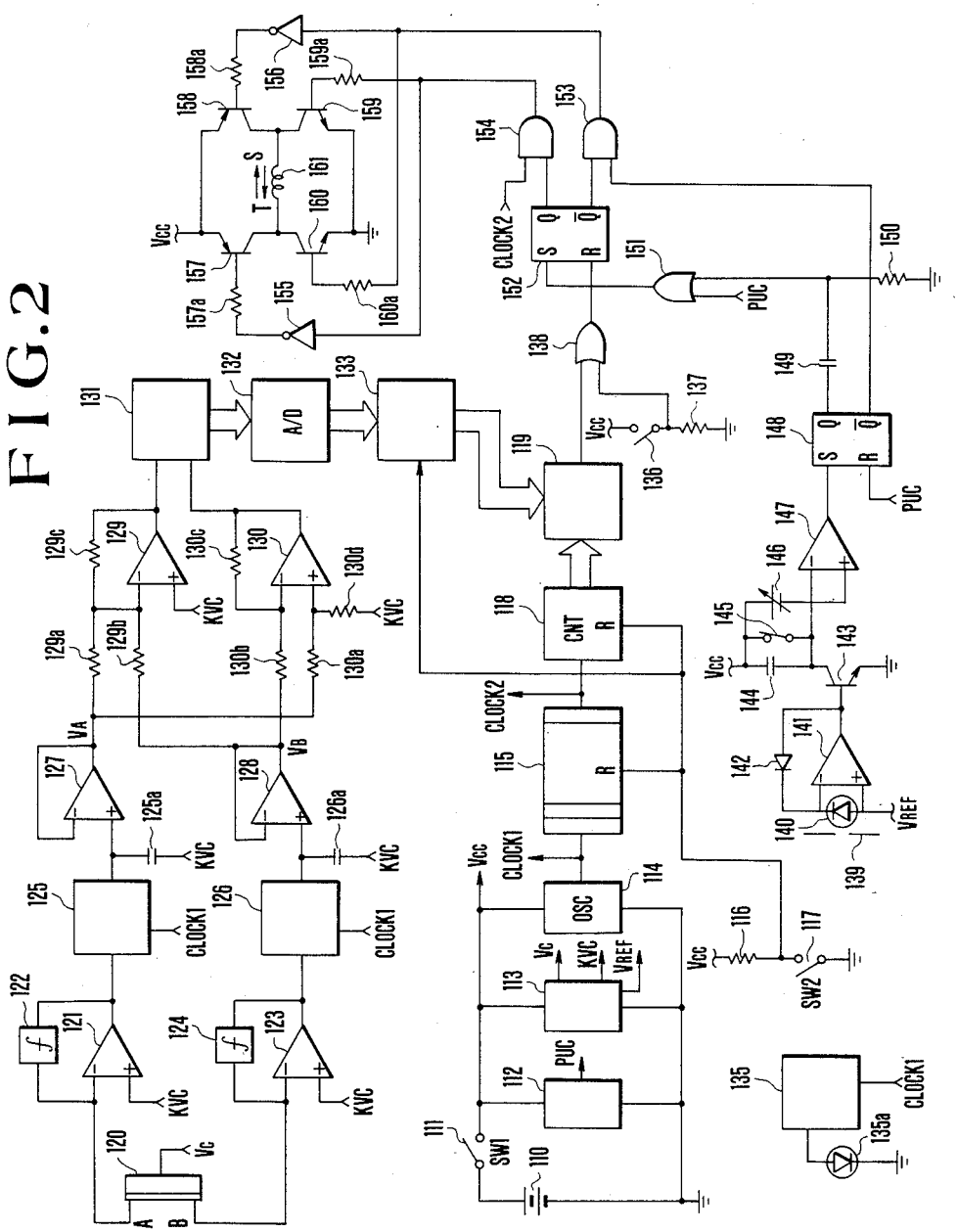
FIG. 2 is an electrical circuit diagram, partly in block form, of a control circuit of the camera of FIG. 1.

Next, the control circuit of this embodiment will be described by reference to FIG. 2. And it should be noted that this circuit exemplifies a range finder using a semiconductor position sensor device (hereinafter abbreviated as "PSD").

The circuit includes an electrical power switch or battery 110, a power supply control switch SW1, an initial reset pulse generator 112, a reference voltage generator 113 for producing three different voltages Vc, KVC and $V_{REF}$, an oscillator 114 for producing rectangular waves CLOCK 1 of about 10 KHz, a frequency divider 115 for producing a train of pulses CLOCK 2 with about 100 Hz, a release switch SW2 connected through a resistor 116 to the battery Vcc, a binary counter 118 connected to the frequency divider 115 and having a "RESET" terminal connected to a junction of the resistor 116 and switch SW2 or 117 to which the "RESET" terminal of frequency divider 115 is also connected, and a coincidence circuit 119 having two inputs which are connected to the outputs of the counter 118 and a latch circuit 113.

The position sensor PSD or 120 has two outputs which are connected to respective operational amplifiers 121 and 123 with frequency selectors 122 and 124 connected in the negative feedback networks thereof respectively to form high pass filters. Sample and hold circuits 125 and 126 have condensers 125a and 126a. Operational amplifiers 127 and 128 constitute buffer circuits. Another operational amplifier 129 constitutes an adder together with resistors 129a, 129b and 129c, and another operational amplifier 130 constitutes a subtractor together with resistors 130a, 130b, 130c and 130d. A divider 131, an A/D converter 132, and the latch circuit 133 receptive of a signal from switch SW2 or 117 are further included.

An infrared emitting diode 135a (hereinafter abbreviated as "iRED") is energized by a driver circuit 135 intermittently in synchronism with the signal CLOCK 1.

A junction of the aforesaid AF-END sensor switch 136 and a resistor 137 is connected to one of two inputs of an OR gate 138.

An exposure control circuit includes a photosensitive element or SPC 140 positioned to receive light through an auxiliary diaphragm aperture 139 and connected between two inputs of an operational amplifier 141. Connected in the negative feedback network of operational amplifier 141 is a logarithmic compression diode 142. An expanding transistor 143, a timing condenser 144 connected to the collector of transistor 143, the aforesaid count start switch 145 connected across condenser 144, a reference voltage generator 146 and a comparator 147 responsive to attainment of the voltage stored on the timing condenser 144 to a predetermined level for changing its output, an RS-filp-flop (hereinafter abbreviated as "RS-FF"), a condenser 149 constituting a differentiation circuit together with a resistor 150, a 2-input OR gate 151, another RS-FF 152 of which the outputs Q and $\overline{Q}$ are connected to AND gates 154 and 153 respectively, two pnp transistors 157 and 158 and two npn transistors 159 and 160 constituting a drive circuit for the rotor 19 and the aforesaid printed coil 161 are further included. The transistors 157 to 160 for controlling the direction of current flow to the printed coil 161 are bridge connected to each other. The transistor 157 has its base connected through a resistor 157a and an inverter 155 to the output of AND gate 154. The transistor 158 has its base connected through a resistor 158a and an inverter 156 to the output of AND gate 153. The transistors 159 and 160 have their bases connected through resistors 159a and 160a to the outputs of AND gates 154 and 153 respectively.

In, the operation of this embodiment, when the shutter button of the camera is first actuated, the main switch 111 is closed, whereby all the portions of the circuit are supplied with electrical power and an initial resetting pulse PUC is produced from the pulse generator 112. Therefore, RS-FF 148 is reset, its Q output becoming of a low level and its $\overline{Q}$ output becoming of a high level. Also, this PUC signal is applied through OR gate 151 to set RS-FF 152 so that its Q and $\overline{Q}$ outputs will be at high and low levels respectively. Until this time, however, switch SW2 (117) is not turned on yet, leaving the frequency divider 115 in the reset state. Therefore, the signal CLOCK 2 is not yet produced. For this reason, at the time when RS-FF 152 is set, the outputs of AND gates 153 and 154 are both changed to low level to a turn off all the transistors 157 to 160. Thus, energization of coil 161 does not take place.

In the meantime, when switch SW1 (111) turns on, oscillator 114 produces a signal CLOCK 1. Responsive to this, iRED 135a lights on and off with a repetition rate of about 10KHz under the action of drive circuit 135. This light is projected onto an object to be photographed by an optical system (not shown), and its reflection is focused by another optical system (not shown) to a point on PSD 20 at a location depending on the distance of the object. PSD 20 produces two outputs at terminals A and B thereof which differ from each other by a magnitude depending on the location of the light spot. These photo signals go to the next stage where the high frequency components are amplified with a higher weight by the high pass filters (121, 122) and (123, 124). Their outputs are detected by the next stage sample and hold circuits 125 and 126 in synchronism with the signal CLOCK 1 so that the output components responsive to the projected light from iRED 135a are extracted. Their outputs VA and VB are applied through the buffer circuits 127 and 128 both to the adder 129 and to the subtractor 130. They produce outputs representative of (VA +VB) and (VA − VB) respectively which are applied to the next stage divider 131. At its output there appears an object distance information (VA − VB)/(VA +VB). This information is converted by the next stage A/D converter 132 to a binary coded form. It should be noted that embodiment, the longer the object distance, the larger the binary output.

Then, when the shutter button is further actuated for to a second time switch SW2 (117) is closed, whereby frequency divider 115 and counter 118 are released from the reset state. Therefore, from frequency divider 115, a signal CLOCK 2 (about 100Hz) is produced. Since, at this time, the Q output of RS-FF 152 is of high level, AND gate 154 also produces the signal CLOCK 2. Responsive to this, pnp transistor 157 and npn transistor 159 turn on and off repeatedly, supplying coil 161 with an electrical current of (S) direction in the pulsated form. Thereby, the rotor 19 of FIG. 1 swings to the clockwise direction until it abuts against stopper pin 41 when the coil 161 is energized. When de-energized, it swings backward to the illustrated position under the action of spring 21. Such clockwise movement of rotor 19 causes its armed portion 19a to push the reciprocating lever 7 at the free end 7b thereof. As the reciprocating lever 7 turns counterclockwise, the ratchet 10 moves rightward as viewed in FIG. 1. Because its pawled portion 10a is in engagement with the toothed portion 1c of drive slide 1, the latter is moved to the right while pushing down the pawl lever 16 in engagement with the toothed portion 1d of drive slide 1. Just after the pawl lever 16 comes to engage the next tooth, drive slide 1 is stopped from further rightward movement. This motion of the drive slide 1 is transmitted to axially move the photographic lens (not shown) by one step of predetermined length. After that, when the current supply to the coil 161 is cut off, rotor 19 returns to the illustrated position under the action of the bias force of spring 21, allowing the reciprocating lever 7 to turn clockwise under the action of spring 8 while the ratchet 10 runs over one of the teeth 1c to engage the next tooth when it stops. Such procedure repeats itself each time rotor 19 swings back and forth in response to one pulse of the signal CLOCK 2. Also, in the first half of the first cycle of swinging operation of rotor 19, when drive slide 1 moves away from the illustrated position, the latch lever 13 is released from the locking connection with the bent portion 1b of drive slide 1. Whereby latch lever 13 is turned counterclockwise with its pawl 13a engaging an extension 5e of release slide 5.

In the meantime, the signal CLOCK 2 is counted by the next stage binary counter 118. The output of binary counter 118 is compared with that output of A/D converter 132 which was latched by circuit 133 when switch SW2 (117) was turned on by coincidence circuit 119. Therefore, when the number of signals CLOCK 2 produced has reached a value corresponding to the object distance, coincidence circuit 119 changes its output to high level. This output is applied through OR gate 138 to reset RS-FF 152, whereby the Q output of RS-FF 152 is changed to low level at which the output of AND gate 154 becomes of a level. Therefore, the synchronized current pulses of A direction with the signal CLOCK 2 are no longer supplied to coil 161. Thus, drive slide 1 is stopped from further rightward movement. At this time, the in-focus condition of the photographic lens is established.

Such resetting of RS-FF 152 also causes the pnp transistor 158 and npn transistor 160 to turn on since the two inputs of AND gate 153 are both of high level. Therefore, coil 161 is then supplied with current of (T) direction. Thereby rotor 19 swings from the illustrated position to the opposite or counterclockwise direction. Its arm 19b turns the shutter opening lever 24 in the clockwise direction, and actuates count start switch 145. As the shutter blades 29 are opening, light from the object enters through auxiliary diaphragm aperture opening 139 to SPC 140. Therefore, the output of operational amplifier 141 varies as a logarithmic function of the object brightness. From this time onward, an expanding current flows to the collector of transistor 143, charging timing condenser 144. When the voltage stored on the condenser 144 has reached the same value as that of the reference voltage 146 representative of a correct exposure value, comparator 147 changes its output to high level, thereby RS-FF is set with its Q and $\bar{Q}$ outputs to high and low levels respectively. By the change of the $\bar{Q}$ output of RS-FF 148 to low level, the output of AND gate 153 is also changed to a low level. At this time, therefore, the current supply in the directions T to coil 161 is cut off, and rotor 19 is returned to the illustrated position by the spring 26 which urges the opening lever 24 in the counterclockwise direction, thus terminating the exposure operation.

On the other hand, the Q output of RS-FF 148 when changed to high level is differentiated by circuit (149, 150) and then is applied through OR gate 151 to an S input of RS-FF 152, thereby RS-FF 152 is set. Therefore, the Q output of RS-FF 152 is changed to high level again, causing AND gate 154 to produce again the signal CLOCK 2. Thereby, coil 161 is supplied with the pulsated current in the directions so that rotor 19 responsive to energization swings from the illustrated position to the clockwise direction and responsive to de-energization returns to the illustrated position. Thus, recycling of the swinging operation is initiated again. By this, drive slide 1 is moved further rightward past the remaining one or ones of the teeth 1c, 1d. In the last cycle of this operation, in other words, when the ratchet 10 comes to engage the leftmost tooth 1c and moves it rightward, the left hand bent portion 1a of slide 1 in abutting engagement on the left hand side of release plate 5 moves the latter to the right simultaneously. During this time, a camming portion 5b of release plate 5 pushes downward a pin 16b on the pawl lever 16 whereby the pawl lever 16 is turned counterclockwise to disengage from the toothed portion 1d of drive slide 1. Also at the same time when it occurs, the pawl 13a of latch lever 13 enters the recess 5d of release plate 5 to latch the release plate 5.

Such termination of recycling of swinging operation for the second time also causes AF-END sensor switch 136 to turn on by the bent portion 1b of drive slide 1. Therefore, the output of OR gate 138 of FIG. 2 rise to a high level again, resetting RS-FF 152. Therefore, the Q output of RS-FF 152 is changed to low level which in turn causes the output of AND gate 154 to change to low level. Thus, the synchronized pulsated current supply with the signal CLOCK 2 to coil 161 is stopped.

By stopping the current supply to coil 161, rotor 19 returns to the illustrated position by the bias force of spring 21, and the reciprocating lever 7 also returns while turning clockwise by the bias force of spring 8. At this time, ratchet 10 turns clockwise because a pin 10b on ratchet 10 is pushed down by a camming portion 5c of release plate 5. Thereby ratchet 10 is disengaged from the toothed portion 1c of drive slide 1, permitting the latter to move leftward under the action of the bias force of spring 4. At the terminal end of this movement, the bent portion 1b strikes the latch lever 13 at its arm, and the release plate 5 is released from the connection therewith. Then the release plate 5 is moved to the left by the bias force of spring 6. Thereby the pawl lever 16 and ratchet 10 are released from engagement in the clockwisemost positions and are brought into engagement with respective toothed portions 1c and 1d of drive slide 1 again. Thus, the illustrated initial position is resumed.

As for the sequence of operations of the camera, this is followed by an automatic film winding operation. By this, a single-frame exposure operation is terminated.

Figure 4:
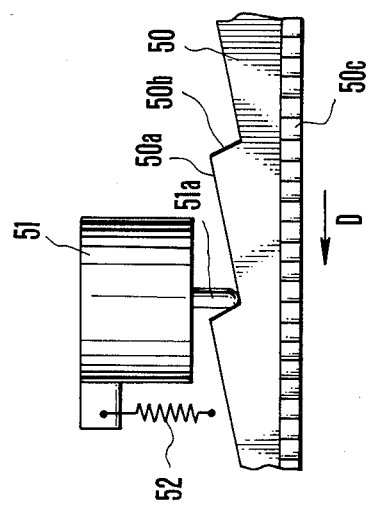
FIG. 4 is a side view of the main parts of the camera of FIG. 3.
Figure 3:
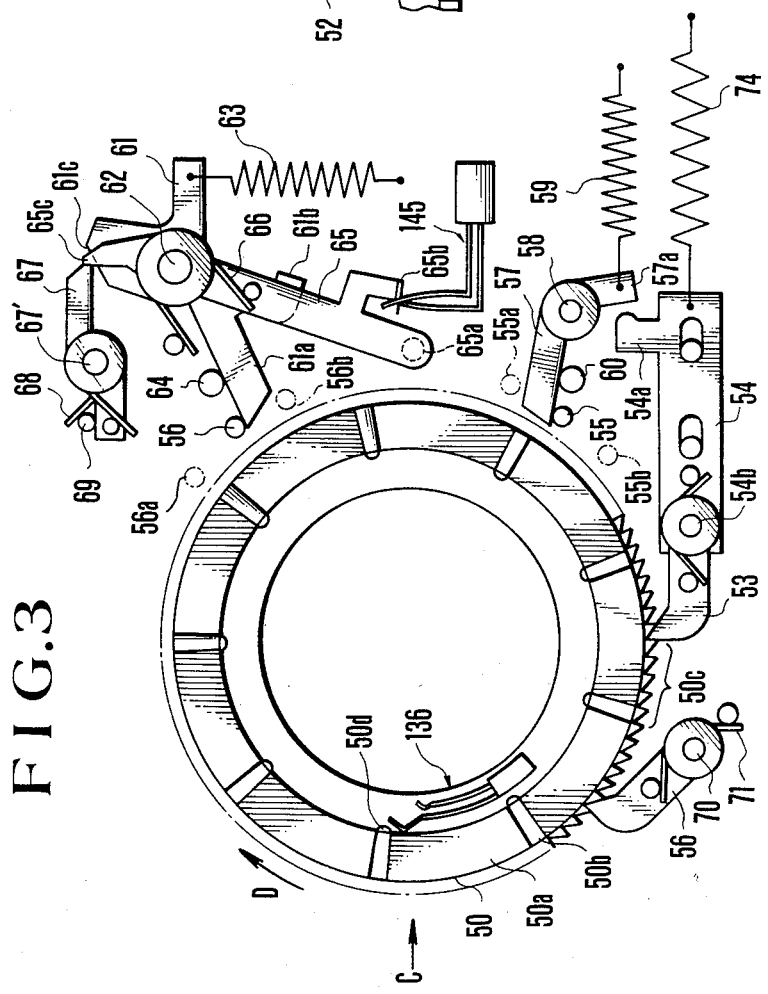
FIG. 3 is an elevational view of another embodiment of the camera according to the invention.

FIG. 3 illustrates another embodiment of the automatic focusing mechanism for a camera according to the present invention. A control circuit therefor is similar to that shown in FIG. 2. A drive ring 50 is arranged to be rotatable about an optical axis of the photographic lens (not shown) and has on its one end surface a plurality of, in this instance, nine, continuous camming portions of two slopes 50a and 50b as illustrated in FIG. 4. A pin 51a axially extending from a photographic lens holder 51 abuts on the camming surface 50a, 50b so that when the drive ring turns in a clockwise direction of arrow D, the photographic lens holder 51 is moved axially forward. A spring 52 urges the photographic lens holder 51 so that when the pin 51a comes to ride on the second slope 50b, the drive ring 50 is driven to turn in the direction of arrow D as it returns to the illustrated position of FIG. 4.

Turning to FIG. 3 again, the drive ring 50 is provided with a great number of teeth 50c formed in the entire length of the outer periphery thereof and with the same number of actuator projections 50d for the AF-END sensor switch 136 as that of cams 50a, 50b formed in the inner periphery thereof. Each of the actuator projections is arranged so that when the pin 51a of the photographic lens holder 51 slips down along the second slope 50b, the switch 135 is instantaneously turned on.

A ratchet 53, a reciprocating slide 54 and a pawl lever 56 are similar in function to those shown in connection with the foregoing embodiment. Two pins 55 and 56 are provided on a rotor (not shown). In this embodiment, the rotor rotates about the optical axis. A rotor lever 57 is pivotally mounted at a pin 58 provided on a base plate (not shown) and is urged by a spring 59 to turn counterclockwise. Its counterclockwise movement is limited by a pin 60 provided on the base plate. The free end of rotor lever 57 abuts on the pin 55 to hinder the rotor from turning counterclockwise when a coil of the rotor is not energized. The other pin 56 of the rotor abuts on a shutter closing lever 61 so that the rotor does not rotate when not energized. The closing lever is pivotally mounted at a pin 62 provided on the base plate and is urged by a spring 63 to turn in a clockwise direction. Also its one arm 61a abuts on a pin 64 provided on the base plate to hinder its rotation. As has been described above, the free end of the arm 61a abuts on the pin 56 of rotor. An opening lever 65 is pivotally mounted on the common pin 62 of the closing lever 61 and is urged by a spring 66 to turn counterclockwise. Also when in engagement with a bent portion 61b of closing lever 61, its counterclockwise movement is limited. For it should be noted that, the bias force of spring 66 for the opening lever is weaker than that of spring 63 for the closing lever 61. The free end of opening lever 65 carries a blade drive pin 65a engaging with shutter blades (not shown) so that when opening lever 65 turns from the illustrated position in the counterclockwise direction, the shutter blades are opened. Another bent portion 65b of opening lever 65 when in the illustrated position maintains a similar count switch 145 to that of FIG. 1 in ON state. When the shutter blades start to open, it is turned off. A blade latch lever 67 is pivotally mounted at a pin 67 provided on the base plate and it is urged by a spring 68 in a clockwise direction. Its clockwise movement is limited by a pin provided on the base plate.

With regard to the operation of the mechanism of FIGS. 3 and 4 since the control circuit usable in this embodiment is similar to that described in connection with the first embodiment. Its operation is not described here again.

At first, the coil (not shown) is supplied with current flowing in that direction which results in counterclockwise movement of the rotor and the pins 55 and 56 are moved to positions shown by dashed line circles 55a and 56a. During this time, pin 55 turns rotor lever 57 in a clockwise direction so that the arm 57a of rotor lever 57 strikes the reciprocating slide 54 at its arm 54a so that the slide 54 and ratchet 53 as a unit move to the left as viewed in FIG. 3, whereby the drive ring 50 is turned one tooth 50c in the clockwise direction. At the termination of clockwise movement, the drive ring 50 is arrested by a pawl lever 56 which is pivotally mounted at a pin 70 and is urged by a spring 71 in a clockwise direction. By this operation, the photographic lens holder 51 of FIG. 4 is driven to move axially one step of predetermined length forward. When de-energized, rotor lever 57 returns to the illustrated position shown by the solid line by the bias force of spring 59. Such procedure repeats itself a number of times depending on the object described similarly as described in connection with the first embodiment. Thus, the photographic lens is moved stepwise to an in-focus position.

When the in-focus position is reached, the coil (not shown) is supplied with current flowing in the opposite direction which results in clockwise movement of the rotor until pins 55 and 56 take positions 55b and 56b. During this time, pin 56 turns the shutter closing lever 61 in a counterclockwise direction, leaving opening lever 65 stationary in the illustrated position by a latch lever 69 engaging one arm 65c thereof. But, just before pin 56 reaches the position 56b, a cam 61c formed on one end portion of closing lever 61 turns latch lever 69 in a counterclockwise direction, whereby opening lever 65 is released from the latching connection. Then, the opening lever 65 turns in a counterclockwise direction under the action of spring 66, opening the shutter blades (not shown). At the termination of duration of the computer exposure time, the current supply to the coil is cut off, whereby closing lever 61 is turned in a clockwise direction by the bias force of spring 63, while turning opening lever 65 in a clockwise direction in engagement with its bent portion 61b. Thus, the shutter blades are closed. At the same time, latch lever 69 returns to the illustrated position.

Then, soon after the current supply to the coil is cut off, similarly as in the first embodiment, a current of that direction which results in counterclockwise movement of the rotor is again supplied to the coil in a pulsated form, thereby pins 55 and 56 are moved again to the positions 55a and 56a. During this time, pin 55 turns rotor lever 57 in the clockwise direction. As this procedure repeats itself, the drive ring 50 turns stepwise in the clockwise direction. Thereby, the first or ascending slope 50a of the cam of the drive ring moves away from the pin 51a of photographic lens holder 51. At this time, spring 52 brings the photographic lens holder 51 to the initial position, illustrated in FIG. 4, while pin 51a, pushes the second of descending slope 50b of the cam. By this operation, the drive ring 50 is further turned in the clockwise direction by one more tooth 50c. Also at this time as has been described before, AF-END sensor switch is instantaneously turned on, stopping the above-described control circuit, and cutting off the current supply to the coil. Thus, the single frame exposure operation followed by the charging operation of the photographic lens is completed. At this time, all the parts are in the initial position.

Compared with the foregoing embodiment, this embodiment, because there is no necessity for turning the drive ring 50 corresponding to the drive slide plate 1 backward for resetting purposes has the advantage that a resetting mechanism including the release slide plate 5 or the like can be omitted. Another advantage is that the load on the rotor, which in the first embodiment is increased because the release slide plate 5 must be pushed along with the drive slide plate 1 in the last step of movement of the drive slide plate 1, remains constant.

As has been described in greater detail above, according to the present invention, at the same time when the photographic lens is moved to the in-focus position, a charging for the photographic lens to the initial position is also performed by the electromagnetic force. The use of such automatic focus adjusting device, therefore, provides the possibility of simplifying the structure of the mechanisms of the camera due to the omission of a special mechanism for charging the photographic lens in response to winding of the film. This gives a great advantage enabling realization a camera of reduced size with low price.

While specific embodiments of the invention have been shown and described in detail to illustrate the application of the inventive principles, it will be understood that the invention may be embodied otherwise without departing from such principles.

What we claim:

1. An automatic focus adjustment device for a camera having an optical system for automatically performing focus adjustment of said optical system, comprising:
   (a) focus adjustment means for adjusting said optical system to an in-focus state by a movement from a first position towards a second position;
   (b) driving means for driving said focus adjustment means from the first position towards the second position;
   (c) bias means for returning said focus adjustment means to the first position;
   (d) blocking means for blocking said focus adjustment means from being returned by said bias means from its shifted position to the first position; and
   (e) releasing means for placing said blocking means in an inactive state in response to said focus adjustment means as it reaches the second position, thus allowing said focus adjustment means to return to the first position by operation of said bias means.

2. A device according to claim 1, wherein said driving means includes electromagnetic means which rotates from a reference position towards the first position thus driving said focus adjustment means from the first position towards the second position, and at the same time rotates from said reference position towards a second direction thus effecting an exposure action.

3. A device according to claim 2, further comprising control means which rotates said electromagnetic means from said reference position towards the first direction during a course of adjustment by said focus adjustment means of said optical means to an in-focus state, and at the same time rotating said electromagnetic means from said reference position towards the second direction after the focus adjustment means has adjusted said optical system to an in-focus state.

4. A device according to claim 2, further comprising: control means which rotates said electromagnetic means from said reference position towards the first direction for shifting said focus adjustment means to the second position after the electromagnetic means has completed an exposure operation.

5. A device according to claim 1, further comprising stopping means which stops said shifting of the focus adjustment means towards the second direction when the optical system has been adjusted to an in-focus state.

6. A device according to claim 5, further comprising reactuating means for shifting said focus adjustment means again towards the second position after said focus adjustment means is stopped by said stopping means.

7. A driving device for driving an optical system along the direction of an optical axis, comprising:
   (a) operating means which shifts from a first position towards a second position for shifting said optical system along the direction of the optical axis;
   (b) driving means for driving said operating means from the first position towards the second position;
   (c) bias means for returning said operating means to the first position;
   (d) blocking means for blocking said operating means from being returned by said bias means from its shifted position to the first position; and
   (e) releasing means for placing said blocking means in an inactive state in response to said operating means as it reaches the second position, thus allowing said operating means to return to the first position by operation of the bias means.

8. A camera, comprising:
   (a) driving means which effects a swinging movement by an electromagnetic force;
   (b) focus adjustment means for shifting from a first position towards a second position in association with said swinging movement of the driving means thus adjusting a photographic optical system to an in-focus state;
   (c) control means for stopping said driving means when said photographic optical system is adjusted to an in-focus state, said control means actuating said driving means again until said focus adjustment means reaches the second position after a completion of an exposure operation;
   (d) bias means for returning said focus adjustment means to the first position;
   (e) blocking means for blocking said focus adjustment means from being returned by the action of said bias means from its shifted position to the first position; and
   (f) releasing means for placing said blocking means in an inactive state in response to said focus adjustment means as it reaches the second position thus allowing said focus adjustment means to return to the first position by operation of said bias means.

* * * * *